United States Patent Office 2,726,254
Patented Dec. 6, 1955

2,726,254

TIN MERCAPTIDES

William E. Leistner and Olga H. Knoepke, Brooklyn, N. Y.

No Drawing. Original application June 30, 1950, Serial No. 171,549. Divided and this application May 6, 1952, Serial No. 286,438

2 Claims. (Cl. 260—429)

This invention relates to a stabilizer for vinyl resins. The invention is particularly useful in connection with stabilizing polyvinyl chloride resins. For this reason the invention will be illustrated by description in connection with such use.

The stabilizers which are in most common use today for polyvinyl chloride resins include such materials as dibutyl tin maleate or the corresponding dilaurate. These stabilizers have the disadvantage of requiring a Grignard reagent in their synthesis and being therefore relatively expensive. They have also the disadvantage of being heat unstable at the high temperatures normally encountered in the processing of vinyl compounds, this instability causing objectionable discoloration of the plastic. Also, at least occasionally, the stabilizers cause surface bloom.

We have now discovered a class of stabilizers that are more effective in preventing discoloration and decomposition at elevated temperatures, a class which may be manufactured without the Grignard synthesis.

Briefly stated, the invention comprises certain new tin mercaptides, simple derivatives thereof or a mixture of individual ones of this general class with each other which are useful as stabilizers for vinyl chloride resins.

Our new stabilizers are compounded with the vinyl resins with conventional equipment and technique. In fact, our method of using the new stabilizers is the conventional one except as more fully set forth in our copending application, Serial No. 171,549, filed June 30, 1950, of which this is a divisional.

The stabilizer used is a member of the general class of tin mercaptides. The stabilizer must be substantially non-volatile at the ordinary temperatures, stable on exposure alone to air, light and moderately elevated temperatures such as 350° to 450° F., and soluble in the selected vinyl resin, that is, compatible to the extent that it may be compounded with the resin in compounding operations that are usual in this industry. Examples of the stabilizers which meet these general requirements and that are used to advantage by us are the following:

| Name | Formula |
|---|---|
| Tin dibutyl di-dodecylmercaptide | $(C_4H_9)_2Sn(S.C_{12}H_{25})_2$ |
| Tin dibutoxy di-octylmercaptide | $(C_4H_9O)_2Sn(S.C_8H_{17})_2$ |
| Tin dibutoxy di-phenylmercaptide | $(C_4H_9O)_2Sn(S.C_6H_5)_2$ |
| Tin diphenoxy di-butylmercaptide | $(C_6H_5O)_2Sn(S.C_4H_9)_2$ |
| Tin diphenoxy di-phenylmercaptide | $(C_6H_5O)_2Sn(S.C_6H_5)_2$ |

Mixtures of two or more of the above may be employed.

While the examples given above are all dimercaptides and while this is our preferred form, the invention relates broadly to the mercaptides represented by the following type formula:

$$(R'S)_xSnR^2_{4-x}$$

In this formula R' and R² represent monovalent groups containing hydrogen and 1 to 18 carbon atoms each. Examples of such groups are alkyls such as methyl, ethyl, butyl, octyl, dodecyl, and octadecyl; aryls such as phenyl, tolyl, or xylyl; oxyalkyl and oxyaryl such as $C_3H_7O$, $C_4H_9O$, $C_8H_{17}O$, $C_6H_5O$, $C_6H_4.CH_3O$, and $C_6H_3(CH_3)_2O$; and the furfuryl and tetrahydrofurfuryl groups.

R' and R² may represent the same or different ones of these groups and R' and R² may individually represent different ones of the groups as in the formula

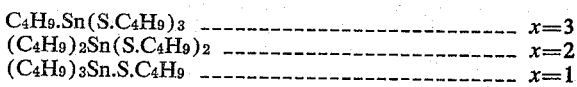

In the type formula, x is an integral number within the range 1 to 3. Examples of tin mercaptides in which R' and R² are $C_4H_9$ and x varies from 3 to 1 are the following:

$C_4H_9.Sn(S.C_4H_9)_3$     $x=3$
$(C_4H_9)_2Sn(S.C_4H_9)_2$     $x=2$
$(C_4H_9)_3Sn.S.C_4H_9$     $x=1$

In using the resin of our invention we use from 0.5 part to 5 parts of our stabilizer for 100 parts of the vinyl resin. Larger proportions may be used but without a corresponding increase in stability of the compounded plastic. Lower proportions give products that lack the desired stability. In commercial operation we use 2 to 3 parts of our stabilizer for 100 of the resin.

The method of preparing resins embodying our invention is illustrated in the following example:

Making dibutyl tin didodecylmercaptide 32 g. commercial tin dibutyl dichloride (94% active) were mixed with 40 g. dodecylmercaptan and heated on the boiling water bath for one hour. The reaction product was taken up in 100 cc. benzene and washed first with a 2% NaOH solution and then with water to take out all HCl formed in the reaction. After drying over $Na_2SO_4$ the benzene was distilled off and a colorless liquid residue obtained. Yield 55 g.

Formula:

$$(C_4H_9)_2Sn(SC_{12}H_{25})_2$$

Any one of the stabilizers of this invention may be made by the procedure described, with obvious substitution in the list of reacting materials. The nature of the substitution will be illustrated by reference to the formulas for the materials which in the underscored parts determine the kinds of groups jointed to tin in the finished product.

$$\underline{(C_4H_9)_2}SnCl_2 + 2\underline{C_{12}H_{25}}SH$$

The underscored parts may be changed as desired to any meaning of R' or R² above, to give the groups selected for occurrence in the finished product. Only the replaceable acid hydrogen of the SH group, the tin, and the Cl are unchanged in making the various ones of the product.

The reactions are moderated by cooling or warming, when necessary to give a satisfactory rate of reaction. The by-product HCl is caused to escape to the air, as by exposure of the reaction batch in a shallow dish to air, by blowing through the batch bubbles of carbon dioxide, or by neutralizing the HCl with sodium carbonate or calcium carbonate and removing the soluble chloride so formed by water washing.

During the reaction, the batch may be in diluted condition, the diluent being an inert, volatile material such as toluene, xylene, or naphtha or an excess of the selected mercaptan when the mercaptan itself is volatile.

It will be understood that it is intended to cover all changes and modifications of the examples of the invention herein chosen for the purpose of illustration which do not constitute departures from the spirit and scope of the invention.

What we claim is:
1. As a composition of matter a dimercaptide of the type formula

$$(R'S)_2SnR^2_2$$

in which R' and R² represent monovalent groups containing hydrogen and 1 to 18 carbon atoms each, R' is selected from the group consisting of alkyls, aryls, furfuryl and tetrahydrofurfuryl, and R² is selected from the group consisting of alkyls, aryls, oxyalkyls, oxyaryls, furfuryl and tetrahydrofurfuryl.

2. Dibutyltindidodecylmercaptide of the formula $$(C_4H_9)_2Sn(SC_{12}H_{25})_2$$

References Cited in the file of this patent

UNITED STATES PATENTS

| | | |
|---|---|---|
| 2,258,718 | Rothrock | Oct. 14, 1941 |
| 2,344,002 | Rugeley | Mar. 14, 1944 |
| 2,480,823 | Morris | Sept. 6, 1949 |
| 2,489,518 | Burt | Nov. 29, 1949 |

OTHER REFERENCES

Backer et al.: Rec. trav. chim., vol. 53, pages 1101–1102 (1934); Chem. Abs., vol. 29, page 1061 (1935).

Gilman: O. S. R. D. No. 548, S. N. 236, page 12, May 2, 1942. Declassified January 28, 1946.